(12) United States Patent
Knapp et al.

(10) Patent No.: US 6,417,999 B1
(45) Date of Patent: Jul. 9, 2002

(54) MAGNETORESISTIVE HEAD STABILIZED STRUCTURE AND METHOD OF FABRICATION THEREOF

(75) Inventors: Kenneth E. Knapp, Livermore; Ronald A. Barr, Mountain View, both of CA (US); Chih-Huang Lai, HsinChu (TW); Robert Rottmayer, Wexford, PA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/497,857

(22) Filed: Feb. 4, 2000

(51) Int. Cl.$^7$ .................................................. G11B 5/39
(52) U.S. Cl. ...................................................... 360/322
(58) Field of Search ............................ 360/322, 324.12, 360/325, 327.1, 327.2, 327.23, 327.31, 327.32; 324/252; 338/32; 365/158; 29/603

(56) References Cited

U.S. PATENT DOCUMENTS

| | | | | |
|---|---|---|---|---|
| 5,668,686 A | * | 9/1997 | Shouji et al. | 360/319 |
| 5,923,503 A | * | 7/1999 | Sato et al. | 360/327 |
| 6,111,722 A | * | 8/2000 | Fukuzawa et al. | 360/324.12 |
| 6,128,167 A | * | 10/2000 | Saito et al. | 360/324.12 |
| 6,185,078 B1 | * | 2/2001 | Lin et al. | 360/324.12 |
| 6,226,158 B1 | * | 5/2001 | Pinarbasi | 360/322 |
| 6,278,592 B1 | * | 8/2001 | Xue et al. | 360/324.12 |

* cited by examiner

Primary Examiner—David Hudspeth
Assistant Examiner—Angel Castro
(74) Attorney, Agent, or Firm—Carr & Ferrell LLP (57) ABSTRACT

In at least one embodiment, the method of the present invention is embodied in a method for fabricating a magnetoresistive head structure which includes obtaining a lead and magnetic bias layer, applying a photoresist layer over the lead and magnetic bias layer and about a desired position of a sensor such that the desired position of the sensor is substantially free of the photoresist layer, etching the lead and magnetic bias material substantially at the desired position of the sensor, depositing a sensor at the desired position of the sensor; and removing the photoresist. Obtaining the lead and magnetic bias layers can be done by depositing them. In at least one embodiment, the apparatus of the invention is embodied in a magnetoresistive head structure having a sensor with sides, a lead layer with a portion positioned on either side of the sensor in contact with the sensor so that a sensing current can flow between the portions and through the sensor, and a magnetic bias layer positioned over the lead layer and on either side of the sensor. The magnetic bias layer can be a hard bias or an exchange layer. The sensor preferably is either an anisotopic magnetoresistive element or a spin valve element less than 0.6 μm wide.

9 Claims, 9 Drawing Sheets

MAGNETORESISTIVE HEAD STABILIZED STRUCTURE AND METHOD OF FABRICATION THEREOF

BACKGROUND

Computer storage devices, such as disk drives, use read/write heads to store and retrieve data. A write head stores data by utilizing magnetic flux to set the magnetic moment of a particular area on a magnetic media. The state of the magnetic moment is later read by a read head which senses the magnetic fields.

Conventional thin film read heads employ magnetoresistive material, generally formed in a layered structure of magnetoresistive and non-magnetoresistive materials, to detect the magnetic moments of the data bits on the media. The data bits are positioned in concentric tracks on the storage media. Decreasing the width of these tracks allows an increase in the storage capacity of the media (more tracks per inch). However, the width of the tracks are limited by how narrow both the read and write reads can be made.

The width of conventional read heads have been limited by their method of fabrication. One such method is shown in FIGS. 1a–e.

Figure 1A:
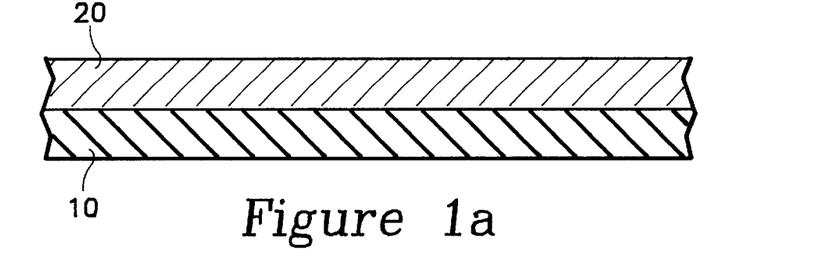
FIGS. 1a–e are side views showing the steps of a conventional method of fabricating a read sensor.

The first step of this process is shown in FIG. 1a and involves depositing a sensor material 20 on top of a layer of alumina 10. The senor material is typically a multi-layered anisotopic magneto-resistive (AMR) or spin valve material.

Figure 1B:
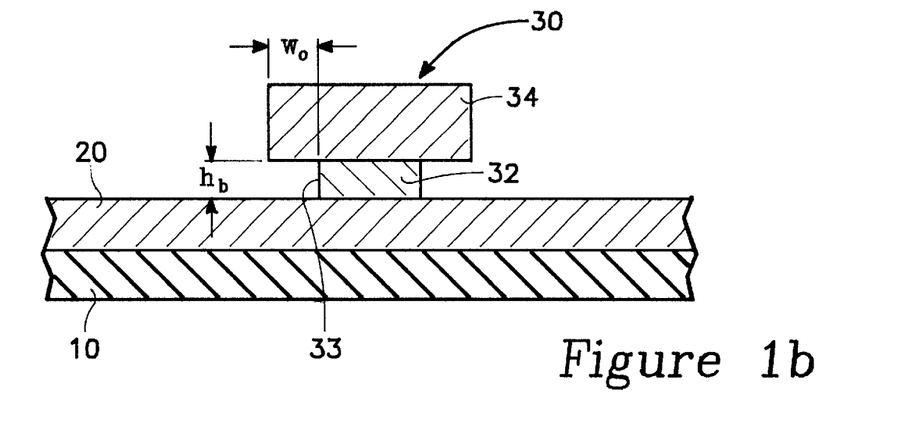

Next, as shown in FIG. 1b, a bi-layer photoresist layer 30 is applied directly on top of the sensor material 20. The bi-layer photoresist 30 has a soft base layer 32 and a hardened overhanging image layer 34. The bi-layer photoresist 30 is positioned directly above the desired position of the sensor element 22 (not shown). As will be further explained, the width of the sensor 22, and thus of the readable track, is limited by the height $h_b$ of the base layer 32 of the photoresist 30.

Figure 1C:
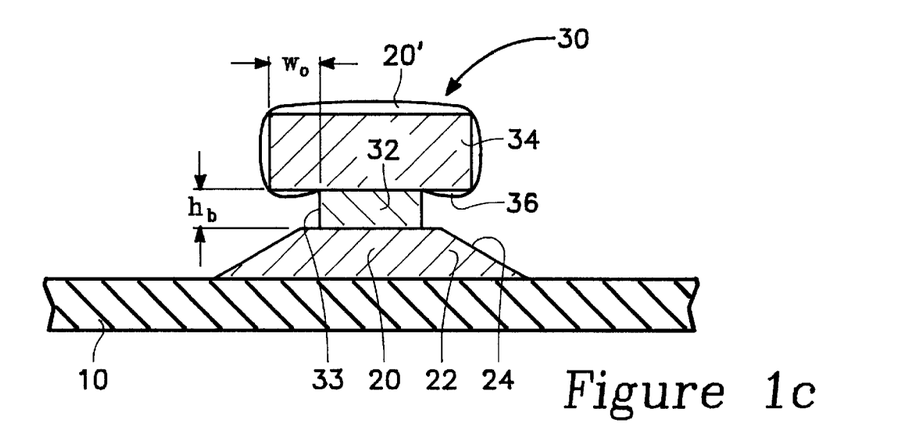

FIG. 1c shows the next step of etching the sensor material 20. During this step sensor material 20 on either side of the sensor element 22 is etched away by an ion beam etch. As can be seen, the ion beam etch removes the sensor material 20 which is not under or immediately adjacent the bi-layer photoresist 30. During this step the shadow of the overhang 36 of the image layer 34 of the photoresist is used with the ion beam set at an angle to define the sensor element 22 with slanted sides 24. Some of the etched sensor material 20' will deposit itself over the photoresist 30.

Figure 1D:
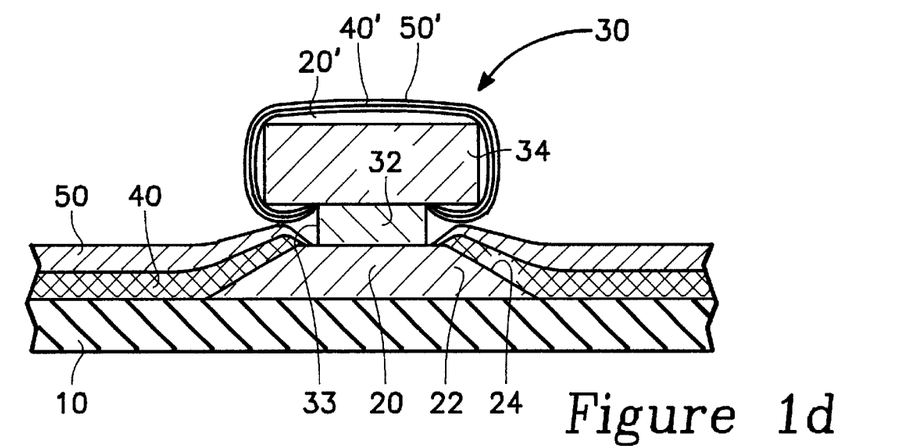

In the next step, a hard bias 40 and lead material 50 are deposited. This is shown in FIG. 1d. The hard bias 40 is deposited over the alumina 10 arid the sides 24 of the sensor 22 up to near the base layer 32 of the photoresist 30. After the hard bias 40 is deposited, the lead material 50 is deposited over the hard bias 40 and up against the side walls 33 of the base layer 32.

Figure 1E:
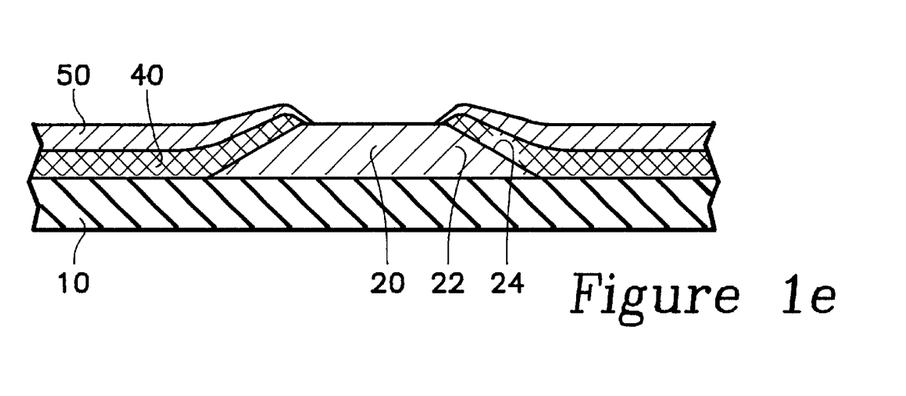

The last step of this process is shown in FIG. 1e. During this step the bi-layer photoresist 30 is lifted off (removed) from the top of the sensor element 22. The resulting structure is a read sensor which has the sensor element 22 biased by the hard bias 40 and which a sensing current can be passed through the sensor element 22 by way of the leads 50.

One problem with this existing method of fabrication is that due to a geometric limitation inherent in a bi-layer overhang structure, the width of the sensor cannot be made less than a certain minimum amount. This limitation in turn limits the minimum width of the data track used. Specifically, the problem is that the bi-layer photoresist must be kept above a certain minimum to avoid fencing which can cause shorting. Fencing is a build-up of material ejected during the etch of the sensor material 20 along the side walls 33 of the photoresist 30. When fencing occurs the later removal of the photoresist will leave a spike of ejected material. This spike of material can contact other elements of the device and cause shorting.

Fencing can be avoided by maintaining an aspect ratio (the width $w_o$ of the overhang 36 relative to the height $h_b$ of the base layer 32) of at least 2. This allows the ejected material sufficient room to collect under the overhang 36 and not on the sides 33 which would cause fencing. Another geometric limitation is due to the thickness $h_b$ of the base layer 32. The base layer 32 must be thick enough to avoid the ejected material 20' and the later deposited material 40' and 50', which collect on the photoresist 30, from extending far enough from the photoresist 30 to come in contact with the sensor 22. Clearly, with a bridge of material between the photoresist and the sensor, the hard bias 40 and lead material 50 will be improperly deposited. As such, to avoid such material bridging, it has been found that the base layer 32 must be thicker than a minimum of about 0.1 $\mu$m.

Therefore, because of the necessary minimum thickness of the base layer $h_b$ (about 0.1 $\mu$m) and the required minimum aspect ratio of the overhang 36 (about twice the thickness of the base layer, $w_0$ about 0.2 $\mu$m), the photoresist 30 typically cannot be narrower then about 0.5–0.6 $\mu$m. Thus, the minimum track widths of the media used with read sensors made by this conventional method are limited to a minimum of about 0.5–0.6 $\mu$m.

Additional problems with the conventional method include low film density and poor composition control of the multi-element materials deposited to create the read head. With the existing method, the hard bias material is sputter deposited over the sensor 22. The shadowing effect of the overhang 36 causes an uneven composition as the lighter mass element, such as cobalt, which can be deposited at higher angles (relative to the vertical), will be deposited in greater amounts under the overhang 36. The area under the overhang 36 will likewise have lesser amounts of the heavier elements such as platinum and tantalum. As a result, near the sensor junction there will exist low film density and varied material composition. Which in turn results in poor magnetic properties (e.g. $H_c$, and $M_rT$) of the hard bias layer.

Therefore, a method is sought which will allow fabrication of apparatuses with significantly narrower read sensors, such that an increase in data storage can be achieved through the use of narrower data tracks. The method must fabricate the sensor in a manner which will avoid fencing and which will not result in low film density and poor composition control. Also, the method must perform these tasks while minimizing the cost and time of fabrication.

SUMMARY

The method of the present invention is embodied in a method for fabricating a magnetoresistive head structure with a narrow read sensor.

In at least one embodiment of the method, the steps include obtaining a lead and magnetic bias layer, applying a photoresist layer over the lead and magnetic bias layer and about a desired position of a sensor (such that the desired position of the sensor is substantially free of the photoresist layer), etching the lead and magnetic bias material substantially at the desired position of the sensor, depositing a sensor at the desired position of the sensor, and removing the photoresist.

The step of obtaining a lead and magnetic bias layer can include depositing a lead layer and depositing a magnetic bias layer over the lead layer. It is preferred that the lead layer is deposited as a layering which includes a first tantalum layer about 50 Å thick, a gold layer about 300 Å thick positioned over the first tantalum layer, and a second tantalum layer about 50 Å thick positioned over the gold layer. The magnetic bias layer can be a hard bias layer or an exchange layer. It is preferred that the hard bias layer is deposited as a layering which includes an underlayer of chromium about 50–200 Å thick and a permanent magnet layer over the underlayer of cobalt chromium and platinum about 500 Å thick.

With the magnetic bias layer being an exchange layer, the method further includes a step of annealing to set the exchange. This step occurs after the step of obtaining the lead and magnetic bias layers. It is preferred that the annealing step is a magnetic anneal at about 400 C. It is also preferred that the exchange layer is deposited as a layering which includes a first nickel iron layer about 75 Å thick, a manganese nickel layer about 300 Å thick positioned over the first nickel iron layer, and a second nickel iron layer about 50 Å thick positioned over the manganese nickel layer.

The etching of the lead and magnetic bias material can be performed by an ion beam etch. During the etching, the lead and magnetic bias material can be etched to produce sloping sides adjacent to the desired position of the sensor. The sensor can be a magnetoresistive element. It is preferred that the sensor is either an anisotopic magnetoresistive element or a spin valve element. Further, it is preferred that the sensor has a sensing layer which is less than 0.6 µm wide.

The photoresist layer used in the method is preferably a bi-layer photoresist having a base layer and an image layer over the base layer. The image layer overhangs the base layer at the points adjacent to the desired position of the sensor.

The apparatus of the invention is embodied in a magnetoresistive head structure. In at least one embodiment the magnetoresistive head structure has a sensor with sides, a lead layer with a portion positioned on either side of the sensor (the lead layer being in contact with the sensor so that a sensing current can flow between the portions and through the sensor), and a magnetic bias layer positioned over the lead layer and on either side of the sensor.

It is preferred that the lead layer includes a first tantalum about 50 Å thick, a gold layer about 300 Å thick positioned over the first tantalum layer, and a second tantalum layer about 50 Å thick positioned over the gold layer.

The magnetic bias layer can include either a hard bias layer or an exchange layer. The hard bias layer preferably includes an underlayer of chromium about 50–200 Å thick, and a permanent magnet layer over the underlayer of cobalt chromium platinum about 500 Å thick. In a preferred embodiment, the exchange layer includes a first nickel iron layer about 75 Å thick, a manganese nickel layer about 300 Å thick positioned over the first nickel iron layer, and a second nickel iron layer about 50 Å thick positioned over the manganese nickel layer.

The sensor can be a magnetoresistive element, preferably either an anisotopic magnetoresistive element or a spin valve element. Further, it is preferred that the sensor includes a sensing layer which is less than 0.6 µm wide.

DETAILED DESCRIPTION OF THE PREFERRED EMBODIMENTS

In the preferred embodiments of the present invention, the method of the invention is embodied in a method of fabricating a magnetoresistive head stabilized structure. Preferably, the method produces hard biased or exchange coupled structures for stabilizing anisotopic magnetoresistive (AMR) or spin valve sensors. Likewise, in the preferred embodiments the apparatus of the invention is embodied in a magneto-resistive head stabilized structure which can include hard bias or exchanged coupled stabilized AMR or spin valve sensors.

An advantage of the present invention is that sufficiently narrower read sensors can be achieved. Reducing the read sensor width allows the data storage of the media to be greatly increased by allowing similar reductions in the width of the data tracks of the media. This reduction in width is achieved as the present invention avoids the geometric limitation for fabricating structures inherent in the conventional fabrication methods. The prior fabrication methods involve positioning an overhanging bi-layer photoresist over the portion of the sensor material to define the sensor element, and etching away the uncovered sensor material. With the prior methods, the smallest possible sensor widths, which avoided the problems of fencing and bridging of built up ejected material, were on the order of 0.5–0.6 µm. By effectively inverting placement of the photo-resist, such that the photo-resist is located on either side of the desired location of the sensor element, the present invention completely avoids the geometric limitations of the prior methods. By positioning the photoresist to the sides of the location of the sensor, the width of the sensor is no longer limited by the structure of the photoresist. As such, the width of the sensor can be greatly reduced compared to the conventional sensor widths. Also, since a much greater undercut of the photoresist can be achieved, significantly greater aspect ratios of the width of the undercut to the height of the base layer can be obtained. The greater aspect ratios provide the advantage of reducing the possibility of fencing and bridging during the fabrication of the sensor.

Another advantage of the method of the present invention is that it avoids the prior methods' low film density and poor composition control of the magnetic bias layer. With conventional methods, sputter deposition caused lower mass material to collect under the overhang of the photoresist. This varying composition of the hard bias layer resulted in poor magnetic properties (e.g. $H_c$ and $M_rT$) In contrast, the method of the present invention provides increased composition control and uniform density of the stabilizing materials. This is because the stabilizing materials are deposited on an uniform surface and then patterned to allow for later placement of the sensor. As such, improved magnetic properties of the magnetic bias layer are achieved.

The preferred embodiment of the method includes a method for fabricating a hard bias apparatus 100 and a method for fabricating an exchange stabilized apparatus 300. The preferred embodiments of the apparatus 200 includes a hard bias apparatus and an exchanged stabilized apparatus.

Preferred Embodiments of the Method for Fabricating a Hard Bias Apparatus

In the preferred embodiments of the hard bias method 100 of the present invention, the steps include depositing a lead layer and hard bias material layer 110, applying a photoresist on either side of the desired sensor location 120, etching the lead and hard bias layers 130, depositing a sensor material 140, and lifting off the photoresist 150. These steps are shown in FIGS. 2a–b and 2d–g and are set forth in the flow diagrams in FIGS. 3a–d.

Figure 2A:
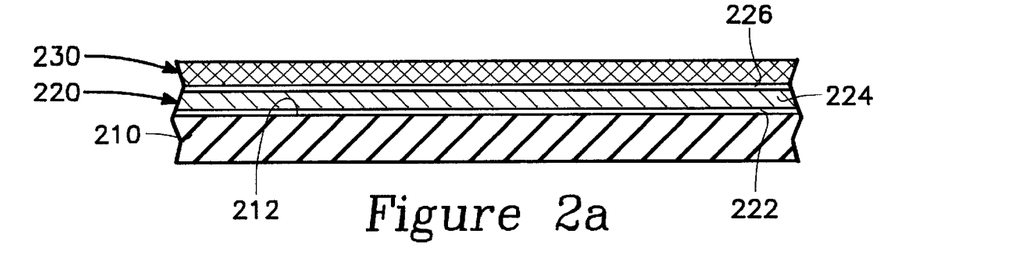
FIGS. 2a–i are side views showing the steps of embodiments of the method of the invention and embodiments of the apparatus of the present invention.
Figure 2B:
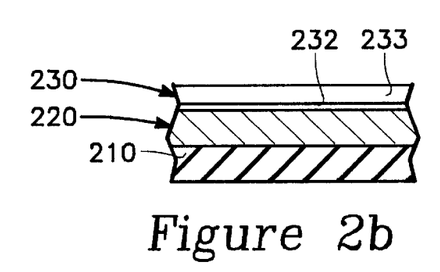
Figure 3A:
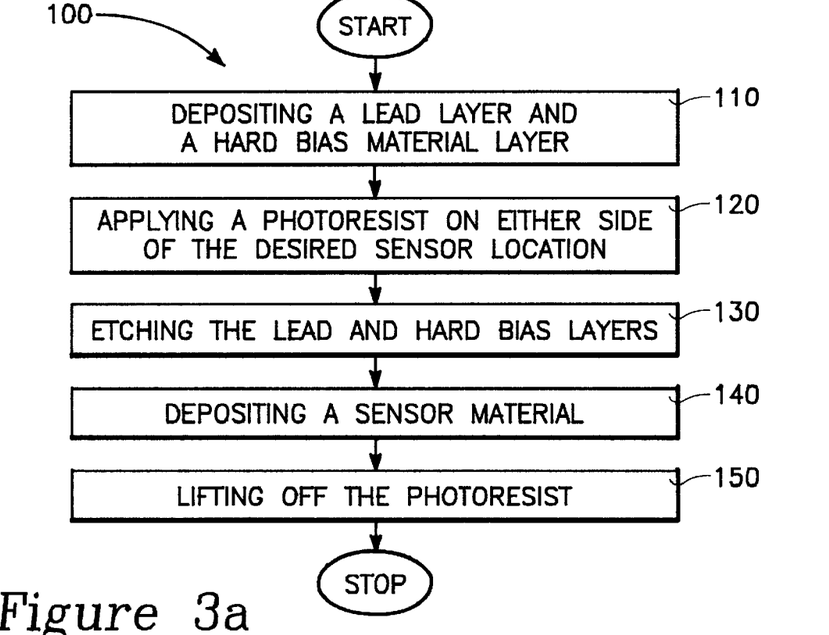
FIGS. 3a–e are flow diagrams illustrating an embodiment of the method of the present invention.
Figure 3B:
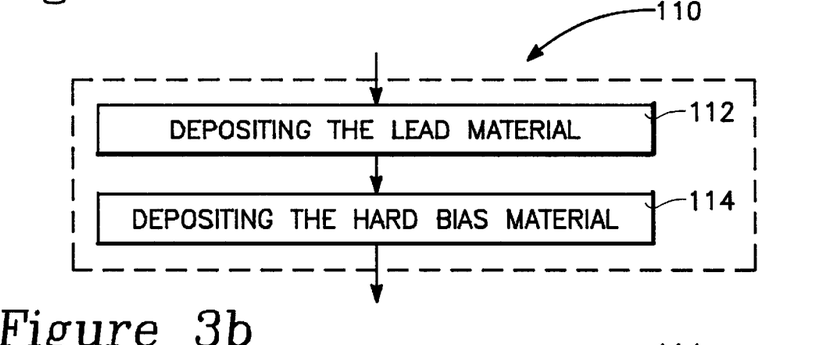

The first step of the method 100 is depositing a lead layer and hard bias material layer 110. This step is shown in FIGS. 2a–b and 3a. This step further includes the steps of depositing the lead material 112 and depositing the hard bias material 114, as shown in FIG. 3b.

As can be seen in FIG. 2a during the step of depositing the lead material 112, a lead material 220 is deposited on top a layer of alumina or read gap alumina 210. The alumina 210 has a relatively uniform upper surface 212, onto which the lead material 220 is deposited. The lead 220 can be any sufficiently conductive material, such as, gold, silver, copper or the like. However, it is preferred that the lead material 220 be deposited as a layering of tantalum(Ta)/gold(Au)/tantalum(Ta). In this embodiment, preferably the bottom layer of tantalum 222 is 50 Å thick, the gold layer 224 is 300 Å thick, and the top layer of tantalum 226 is 50 Åthick. The deposition of the lead material 220 can be performed by any of a variety of well known methods such as magnetron sputtering, rf sputtering, ion beam sputtering, evaporation or the like.

Figure 3C:
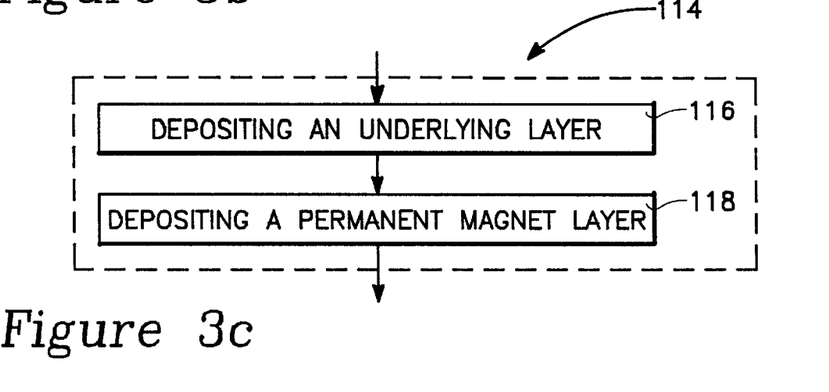

Also, shown as FIGS. 2a–b, during the step of depositing the hard bias material 114 a magnetic bias material 230 is deposited over the lead material 220. In this embodiment, the magnetic bias material 230 is a hard bias material. Preferably, the step of depositing the hard bias material 114 includes the steps of depositing an underlying layer 116 and depositing a permanent magnet layer 118, as shown in FIG. 3c. First, during the step of depositing the underlying layer 116, an underlayer or seed layer 232 is deposited on top of the lead material 220. This step is shown in FIG. 2b. The lead material 220 provides a relatively uniform surface for the deposition. Preferably, the underlayer 232 is a layer of chromium 50–200 Å thick. Alternative materials which can be used for the underlayer 232 include chromium titanium (CrTi) and chromium alloys. The underlayer 232 can be deposited by any of a variety of well known deposition methods, such as, ion beam deposition (IBD), RF diode, RF and DC magnetron sputtering and electron beam evaporation.

Next as shown in FIG. 2b, during the deposition of a permanent magnet layer 114, a permanent magnet layer 233 is deposited over the underlaying layer 232. It is preferred that the material used for the permanent magnet layer 233 is cobalt chromium platinum (CoCrPt). However, other similarly suitable materials could be used for the permanent magnet layer 233, including, cobalt chromium platinum tantalum (CoCrPtTa) and cobalt platinum (CoPt). It is also preferred that the permanent magnet layer have a thickness of 500 Å. The permanent magnet layer 233 can be deposited by any well know method, such as, ion beam deposition (IBD), RF diode, RF and DC magnetron sputtering.

Figure 2C:
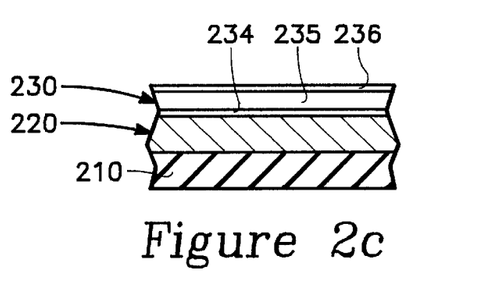
Figure 2D:
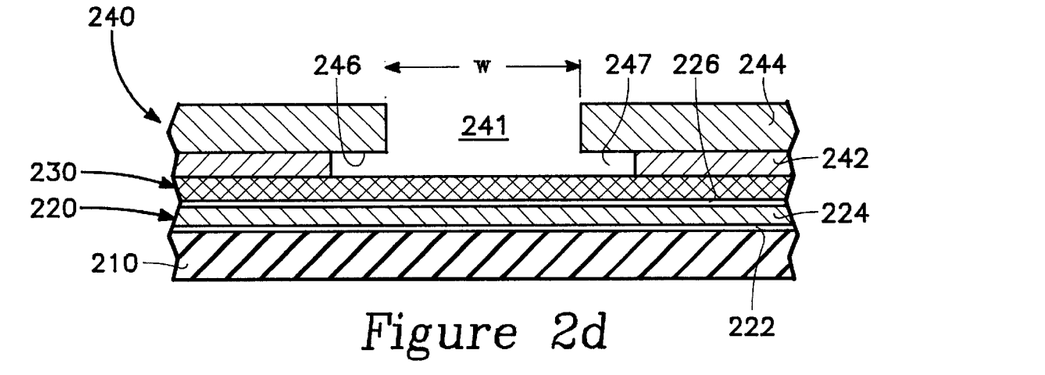
Figure 2E:
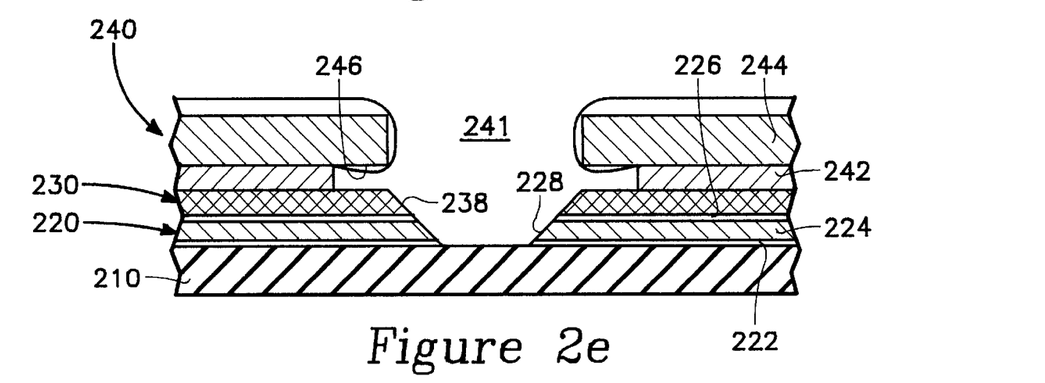

The next step in the method 100 is the step of applying a photoresist on either side of the desired sensor location 120. This step is shown in FIGS. 2d and 3a. During this step, a photoresist 240 is applied on top of the magnetic bias layer 230. It is preferred that the photoresist 240 be a bi-layer photoresist, however, a single photoresist could be used. The photoresist 240 is applied on either side of the desired location of the sensor 250 (not shown). This leaves an opening or gap 241 between the two portions of the photoresist 240. The width W of the gap 241 will determine the width of the read sensor 250, which in turn will determine the width of the data tracks which can be used. It is preferred that the width W of the gap 241 be less than about 0.6 μm.

Each side of the bi-layer photoresist 240 has a base layer 242 and an image layer 244. The image layers 244 are hardened and thus harder than the relatively soft base layers 242. The two image layer s 244 extend inward past the base layers 242, towards each other, and towards the gap 241. By extending beyond the base layers 242, the image layers 244 create overhangs 246 and undercuts 247.

It is preferred that the base layers 242 be PMGI™ 0.2 μm thick and the image layer 244 be a photo-imagable or photo-sensitive layer such as AZ1505™. The bi-layer photoresist 240 can be applied through any of a variety of well known methods including first spinning on the base layer 242 over the magnetic bias 230, then spinning on the image layer 244 over the base layer 242, applying a mask over the photoresist 240, exposing the photoresist 240 to harden the image layer 244, and removing the unhardened portions of the image layer 244 and portions of the base layer 242 with a developer. During such a process, because the base layer 242 is significantly softer (dissolves quicker when a developer is applied) than the hardened portion of the image layer 244, the overhang 246 and undercut 247 are created on each side of the bi-layer photoresist 240. The length of the overhang 246 and depth of the undercut 247, can be varied by controlling the duration of the application of the developer.

The next step in the method 100 is etching the lead and hard bias layers 130. This step in shown in FIGS. 2e and 3a. During this step, the portions of the magnetic bias layer 230 and the lead layer 220 set between the two sides of photoresist 240 are etched away. The etching can be done by a variety of well known methods, such as ion milling and reactive ion beam etching (RIE). However, it is preferred that an ion beam etch be used. The ion beam etch removes the magnetic bias material 230 and the lead material 220 down to the alumina 210 to allow later placement of the sensor 250 (not shown). During the etching, the ion beam can be angled and the shadow of the overhang 246 can be used to produce a set of lead sloping sides 228 and a set of magnetic bias sloping sides 238. By sloping the sides of the lead layers 220 and the magnetic bias layers 230, the width of the sensor 250 (not shown) can be reduced.

Figure 2F:
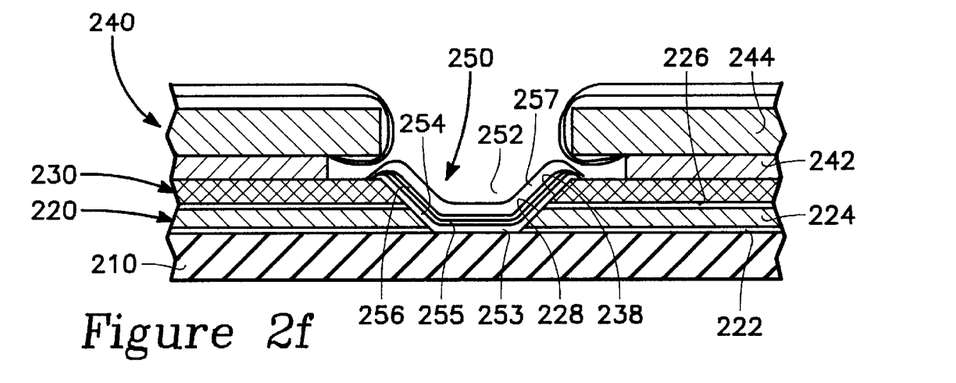

The next step in one embodiment of the method 100 is depositing the sensor material 140. This step is shown in FIGS. 2f and 3a. This step involves the deposition of sensor material 250. As can be seen, the sensor material 250 is deposited over both the exposed alumina 210 and the sides 228 and 238. A variety of types of sensor material can be used, however it is preferred that either an anisotopic magnetoresistive (AMR) or spin valve material be used. FIG. 2f shows the use of a spin valve 252 material.

One advantage to applying the sensor in this manner is that the magnetically soft sensor material can be deposited over a surface with a slight topography with much less difficultly than the deposition of a hard bias or exchange stabilized materials (as is done in the prior methods). This is because the sensor materials do not require a nucleating underlayer as the hard bias and exchange stabilized materials do.

Figure 3D:
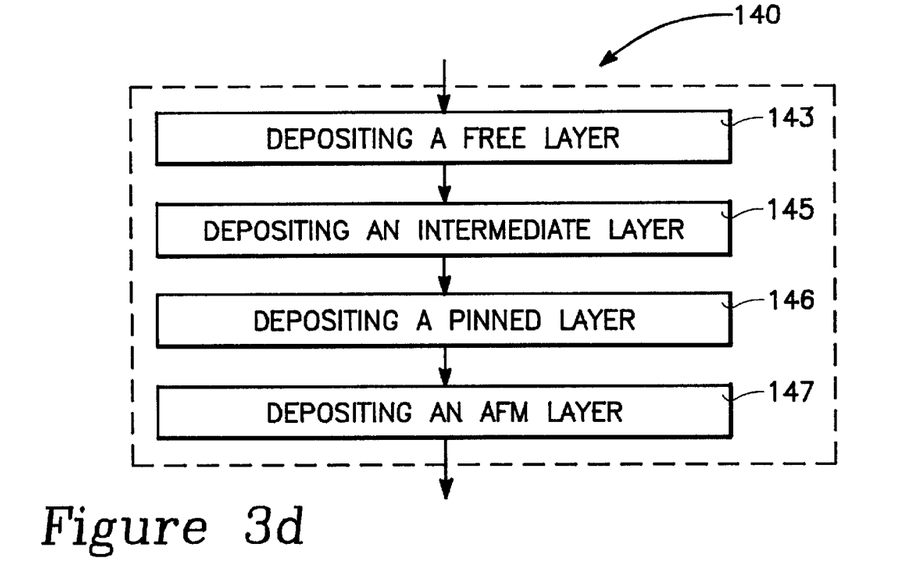

The layering of the spin valve material 252 includes, from the bottom, a free or sensing layer 253, an intermediate layer 255, a pinned layer 256 and an antiferromagnet (AFM) layer 257. Each of these layers are deposited by steps of the step of depositing a sensor material 140, as shown in FIG. 3d. First, the free layer 253 is deposited by a step of depositing a free layer 143. During this step the free layer 253 is deposited over the alumina 210, the lead sloping sides 228 and the magnetic bias sloping sides 238. This allows the free layer 253 to be in direct contact with both leads 220, such that a sensing current can travel from one lead 220 to the other through the free layer 253. The width of the free layer 253 between the leads 220 will correspond to the width of the data track on the media. In the next step, the intermediate layer 255 is deposited over the free layer 253 during the step of depositing an intermediate layer 145. The pinned layer 256 is deposited over the intermediate layer 255 during the step of depositing a pinned layer 146, and the AFM layer 257 is then deposited over the pinned layer during the step of depositing an AFM layer 147. The deposition of the free layer 253, intermediate layer 255, pinned layer 256 and AFM layer 257, can all be done by well known methods, such as, ion beam deposition or sputtering.

Figure 2G:
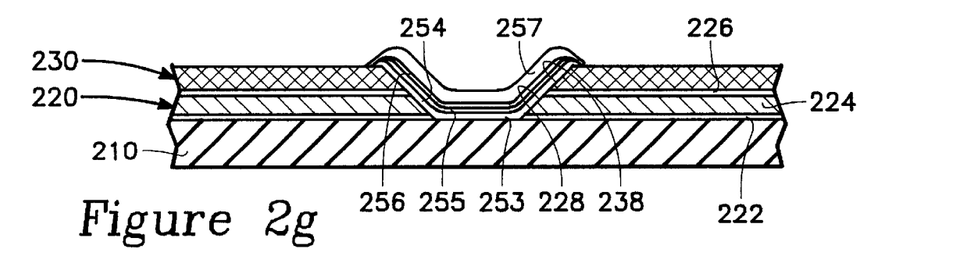

The last step of one embodiment of the method 100 is lifting off the photoresist 150. The result of this step is shown in FIGS. 2g and 3a. This step can be performed by a variety of well known methods, including applying a developer to dissolve the photoresist 240.

Figure 2H:
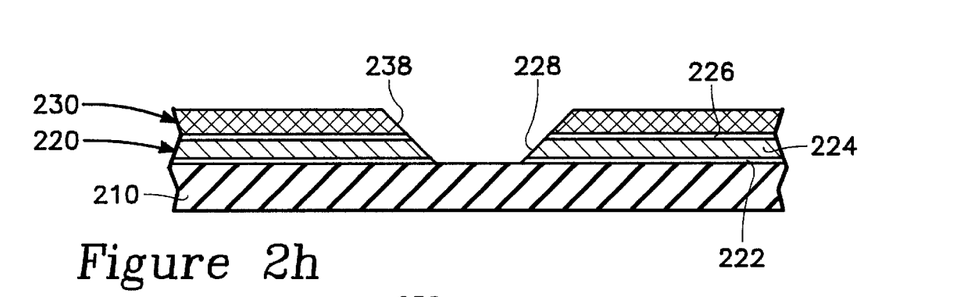
Figure 2I:
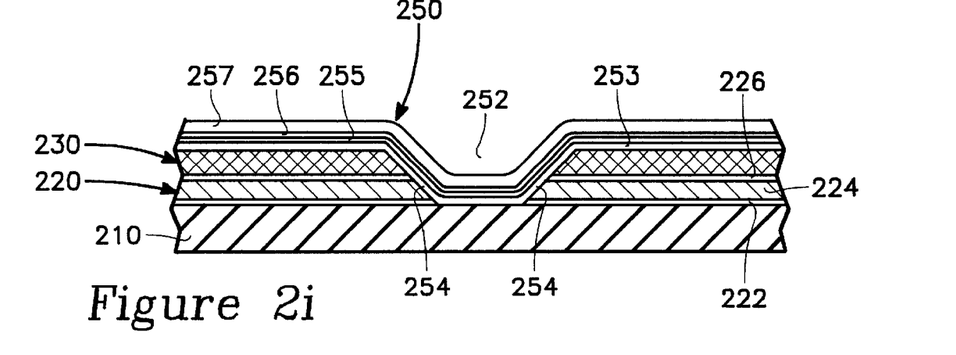
Figure 3E:
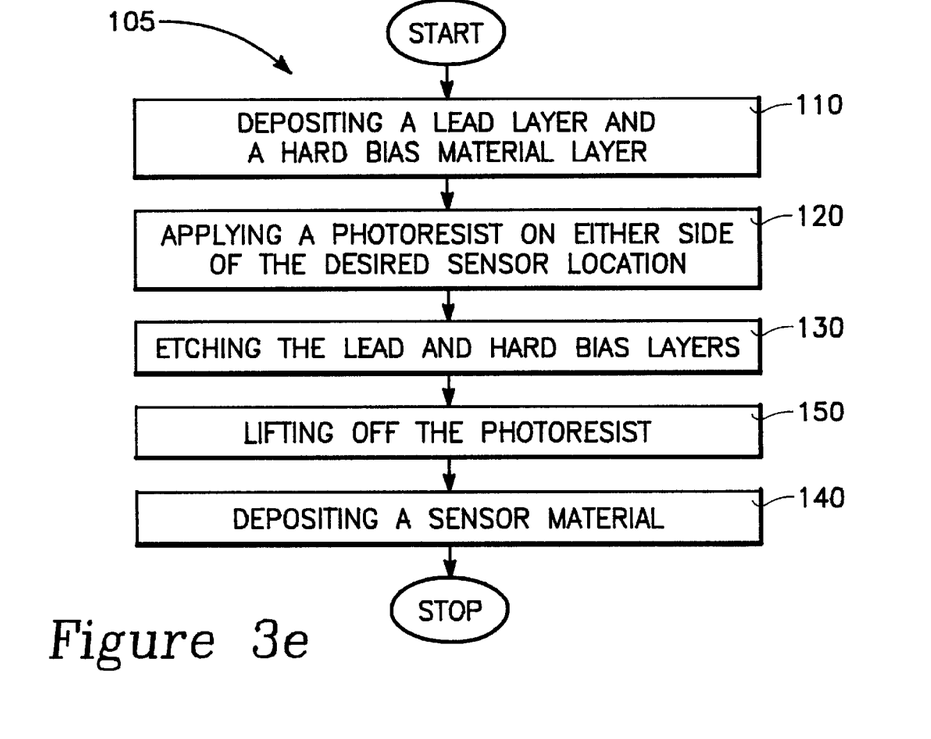

In another embodiment of the method, a method 105 has the step of lifting off the photoresist 150 performed before the step of depositing a sensor material 140. This embodiment is shown in FIGS. 2h–i and 3e. As shown in FIGS. 2h and 3e the photoresist 240 is removed after the step of etching the lead and hard bias layers 130. Then, in the step of depositing a sensor material 140 the sensor material 250 is deposited across the top of the alumina 210, the leads 220 and the magnetic bias 230, as shown in FIGS. 2i and 3e. In this embodiment, with the free layer 253 of the sensor material 250 in direct contact with the magnetic bias layer 230 the layers are exchange coupled.

Preferred Embodiments of the Hard Bias Apparatus

The preferred embodiments of the hard bias apparatus 200 of the present invention includes the alumina 210, leads 220, magnetic biases 230 and the sensor 250. In this embodiment the magnetic bias layer 230 is a hard bias material. The magnetic bias layer is shown in FIG. 2b and the apparatus 200 is shown in FIG. 2g. The apparatus 200 can be fabricated by the method 100 as detailed above.

The alumina or read gap alumina 210 is preferably made of alumina ($Al_2O_3$) and functions to insulate the read sensor. Other insulative materials can be used for the read gap alumina 210, such as $SiO_2$, $Ta_2O_5$, $Si_3N_4$, MgO, SiC and amorphous carbon. The alumina 210 typically is between 0.01–0.10 μm thick. The alumina 210 is the bottom layer of the apparatus 200 and provides a relatively uniform surface for the lead layer 220 which is deposited over the alumina 210.

The leads 220 are positioned over the alumina 210 and on either side of the sensor 250. The leads 220 can be of any sufficiently conductive material, such as gold, silver or copper. However, it is preferred that the leads 220 be a layering of tantalum(Ta)/gold(Au)/tantalum(Ta). The bottom tantalum layer 222 and the top tantalum layer 226 act as seed layers, providing improved adhesion (as compared to the adhesion of gold) to the adjacent layers of material. In this embodiment, preferably the bottom layer of tantalum 222 is 50 Å thick, the gold layer 224 is 300 Å thick, and the top layer of tantalum 226 is 50 Å thick. The leads 220 also preferably have sloping sides 228. The leads 220 function to supply a sensing current across the sensor 250.

The magnetic biases 230 are positioned above the leads 220 and on either side of the sensor 250. In this embodiment the magnetic bias layer is a hard bias material and has an underlayer or seed layer 232 and a permanent magnet layer 233, as shown in FIG. 2b. It is preferred that the magnetic bias layers 230 each have sloping sides 238.

The underlayer 232 is positioned below the permanent magnet layer 233 and above the lead layer 220. Although a variety of materials of varying thicknesses can be used as the underlayer 232, it is preferred that the underlayer 232 be a layer of chromium 50–200 Å thick. Alternative materials such as nickel aluminum (NiAl), nickel aluminum chromium (NiAlCr), or a chromium alloy can also be used for the underlayer 232. The underlayer 232 acts as a seed layer for the permanent magnet layer 233. That is, the underlayer 232 functions to obtain a preferred crystal orientation of the permanent magnet layer 233, which will maintain an in-plane magnetization of the permanent magnet layer 233.

The permanent magnet layer 233 is positioned above the underlayer 232. It is preferred that the material used for the permanent magnet layer 233 is cobalt chromium platinum (CoCrPt). However, other similarly suitable materials could be used for the permanent magnet layer, such as, cobalt chromium (CoCr), cobalt chromium platinum tantalum (CoCrPtTa), cobalt chromium tantalum (CoCrTa) or cobalt platinum (CoPt). It is also preferred that the permanent magnet layer have a thickness of 500 Å. The permanent magnet layer 233 functions to provide a magnetic field to pin or bias the sensor 250 to prevent hysteresis in the magnetoresistive response of the sensor. That is, the magnetic field produced by the permanent magnet layer 233 prevents the formation of closure domains at the ends of the free layer of the sensor and thus prevents hysteresis.

The sensor 250 is positioned over the alumina 210 and between the leads 220 and the magnetic biases 230. The sensor 250 can be any of a variety of types of material, however it is preferred that either an anisotopic magnetoresistive (AMR) or spin valve material is used. For spin valve sensors it is preferred that the spin valve be a top spin valve. That is, that the pinned layer be on top of the sensor and the free layer be on the bottom.

As noted, the layering of the spin valve material 252 includes, from the bottom, a free or sensing layer 253, an intermediate layer 255, a pinned layer 256 and an antiferromagnet (AFM) layer 257. The free layer 253 has edges 254. The free layer 253 is in direct contact with both leads 220, such that a sensing current can travel from one lead 220 to the other through the free layer 253. The width of the free layer 253 between the leads 220 will correspond to the width of the data track on the media. The width of free layer 253 is sufficiently small to allow for narrow data tracks, which in turn, allows increased data storage of the media. It is preferred that the width of the free layer 253 between the leads 220 be less than 0.6 μm. The magnetic bias elements 230 are set close enough to the edges 254 of the free layer 253 of the sensor 250 to bias the sensor 250 with the magnetic field of the magnetic bias elements 230.

The free layer 253 functions to sense the position of a magnetic field created by the data bits located on an adjacent recording media. The free layer 253 performs this function by being free to change its magnetic orientation in response to the magnetic field of the magnetized data bits. As the magnetic orientation of the free layer 253 changes, the electrical resistance of the free layer 253, and thus of the device 200, is also changed. The measured changes in the electrical resistance can be converted to correspond to the data stored on the recording media. A variety of materials can be used in the free layer 253, for example, the free layer 253 can be a layer of cobalt iron (CoFe) over a nucleating layer of nickel iron (NiFe) or tantalum (Ta). But, to increase exchange coupling, it is preferred that a tantalum nucleating layer is not used. The intermediate layer 255 is preferably made of copper (Cu). The pinned layer 256 functions to set a reference state for the free layer 253. The pinned layer 256 is preferably made of cobalt iron (CoFe), but can also be made of Nickel Iron (NiFe), Cobalt (Co) or a Heusler alloy. The AFM layer 257 functions to provide a base for the pinned layer 256. The AFM layer 257 can be made of a variety of materials including iridium manganese (IrMn), platinum manganese (PtMn), platinum palladium manganese (PtPdMn) or nickel manganese (NiMn).

Another embodiment of the apparatus of the present invention is shown in FIG. 2i. In this embodiment the sensor material 250 extends across the entire sensor and not over just a portion of the sensor as shown in the embodiment set forth in FIG. 2g. The layering of the sensor material 250 of this embodiment is same as the previous detailed embodiment. That is, the sensor 250 can be any of a variety of types of material, however it is preferred that either an anisotopic magnetoresistive (AMR) or spin valve material is used. For spin valve sensors it is preferred that the spin valve be a top spin valve. That is, that the pinned layer be on top of the sensor and the free layer be on the bottom. The layering of the spin valve material 252 includes, from the bottom, a free or sensing layer 253, an intermediate layer 255, a pinned layer 256 and an antiferromagnet (AFM) layer 257.

Preferred Embodiments of the Method of Fabricating an Exchanged Stabilized Apparatus In the preferred embodiments of the exchanged stabilized method 300 of present invention, the steps include depositing a lead layer and an exchange material layer 310, annealing to set the exchange 320, applying a photoresist on either side of the desired sensor location 330, etching the lead and exchange material 340, depositing a sensor material 350, and lifting off the photoresist 360. These steps are shown in FIGS. 2a–g and are set forth in a flow diagram in FIGS. 4a–d.

Figure 4A:
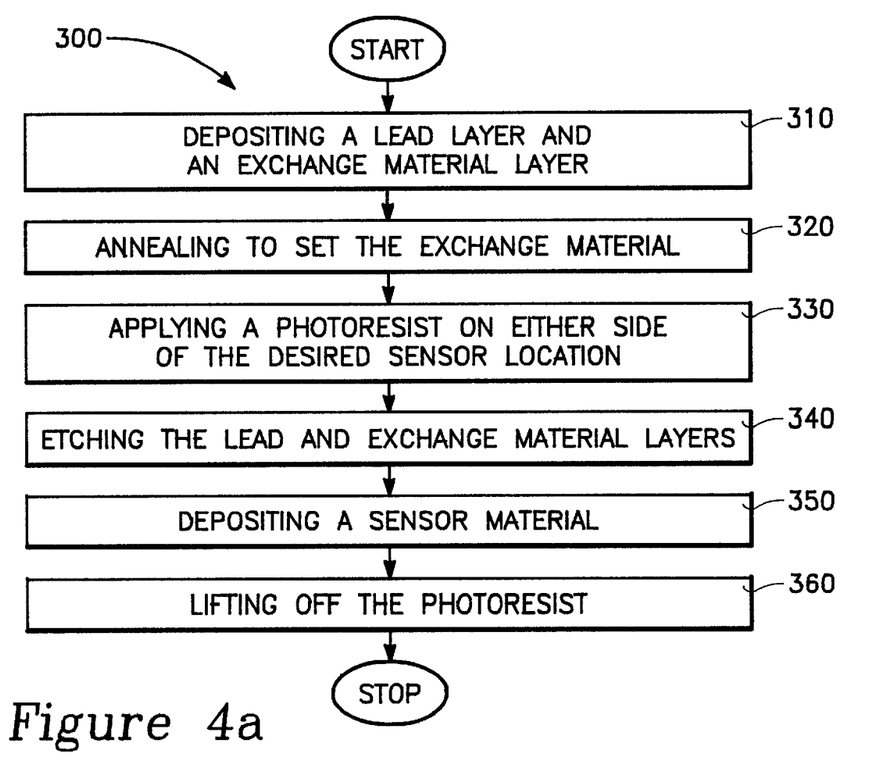
FIGS. 4a–e are a flow diagram illustrating an embodiment of the method of the present invention.
Figure 4B:
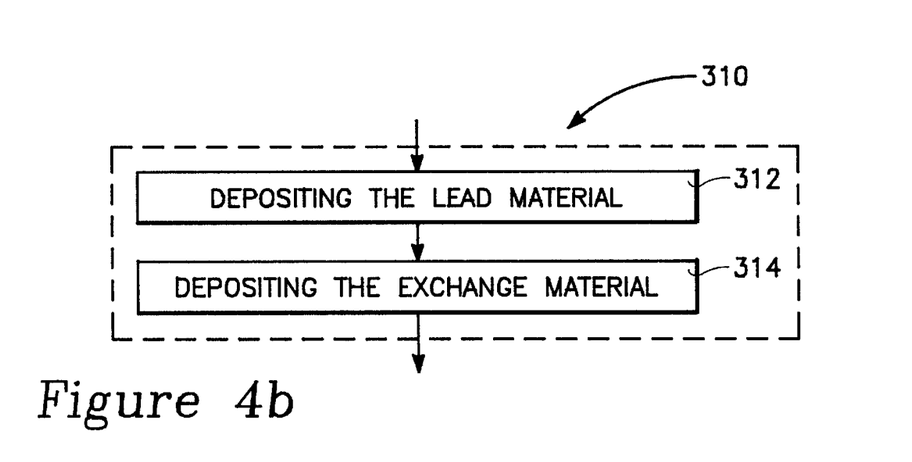
Figure 4C:
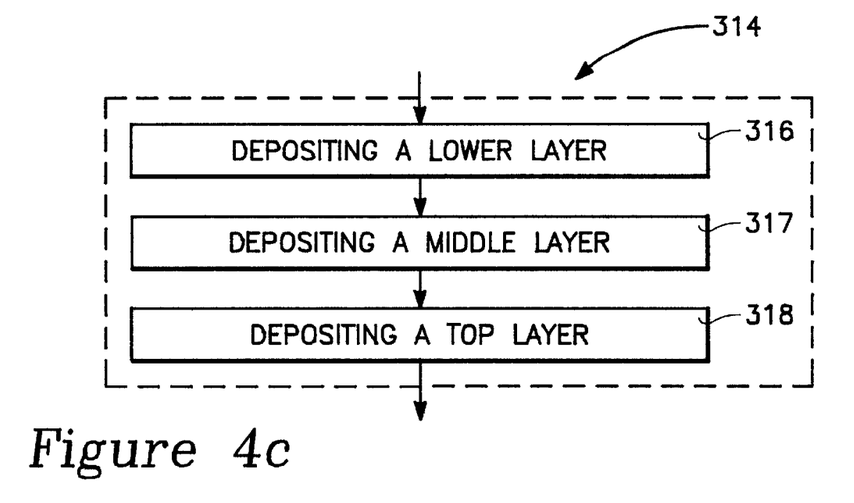

The first step of the method 300 is depositing a lead layer and an exchange material layer 310. This step is shown in FIGS. 2a and 4a. This step further includes the steps of depositing the lead material 312 and depositing the exchange material 314, as shown in FIG. 4c.

As can be seen in FIG. 2a during the step of depositing the lead material 312, a lead material 220 is deposited on top of a layer of alumina or read gap alumina 210. The alumina 210 has a relatively uniform upper surface 212, onto which the lead material 220 is deposited. The lead 220 can be any sufficiently conductive material, such as, gold, silver, copper or the like. However, it is preferred that the lead material 220 be deposited as a layering of tantalum(Ta)/gold(Au)/tantalum(Ta). In this embodiment, preferably the bottom layer of tantalum 222 is 50 Å thick, the gold layer 224 is 300 Å thick, and the top layer of tantalum 226 is 50 Å thick. The deposition of the lead material 220 can be performed by any of a variety of well known methods such as magnetron sputtering, rf sputtering, ion beam sputtering or the like.

Also, as shown in FIG. 2a, during the step of depositing the exchange material 314 a magnetic bias material 230 is deposited over the lead material 220. In this embodiment the magnetic bias material 230 is an exchange stabilized material. Preferably, the step of depositing the exchange material 314 includes the steps of depositing a lower layer 316, depositing a middle layer 317 and depositing a top layer 318, as shown in FIGS. 2c and 4c. First, during the step of depositing the lower layer 316, a lower layer 234 is deposited on top of the lead material 220. The lead material 220 provides a relatively uniform surface. Although a variety of material can be used, preferably the lower layer 234 is a layer of nickel iron (NiFe). Further, it is preferred that the lower layer is 75 Å thick. The lower layer 234 can be deposited by any of a variety of well known deposition methods, including ion beam deposition (IBD), RF diode, RF and DC magnetron sputtering and electron beam evaporation.

Next, during the deposition of the middle layer 317, a middle layer 235 is deposited over the lower layer 234. It is preferred that the material used for the middle layer 235 is manganese nickel (MnNi), manganese platinum(MnPt), manganese palladium (MnPd) or manganese platinum palladium (MnPtPd) . It is also preferred that the middle layer 235 have a thickness of 100–400 Å. The middle layer 235 can be deposited by any well know method, including ion beam deposition (IBD), RF diode, RF and DC magnetron sputtering and electron beam evaporation.

Then, during the step of depositing the top layer 318, a top layer 236 is deposited on top of the middle layer 235. Preferably, the top layer 236 is a layer of nickel iron (NiFe) 50 Å thick. The top layer 236 can be deposited by any of a variety of well known deposition methods, including ion beam deposition (IBD), RF diode, RF and DC magnetron sputtering and electron beam evaporation.

The next step of the method 300 is annealing to set the exchange 320, as shown in FIG. 4a. During this step it is preferred that the device is magnetically annealed, at or about 400 C. This annealing process is done to set the magnetic bias material 230, such that the exchange material will have a permanent magnetic field.

The next step in the method 300 is the step of applying a photoresist on either side of the desired sensor location 330. This step is shown in FIGS. 2d and 4a. During this step, a photoresist 240 is applied over the magnetic bias layer 230. It is preferred that the photoresist 240 be a bi-layer photoresist, however, a single photoresist can also be used. The photoresist 240 is applied on either side of the desired location of the sensor 250 (not shown). This leaves an opening or gap 241 between the two portions of the photoresist 240. The width W of the gap 241 will determine the width of the read sensor 250, which in turn will determine the width of the data tracks which can be used on the media. It is preferred that the width W of the gap 241 be less than 0.6 µm.

Each side of the bi-layer photoresist 240 has a base layer 242 and an image layer 244. The image layers 244 are hardened and thus harder than the relatively soft base layers 242. The two top layers 244 extend inward past the two bottom layers 242, towards each other, and towards the gap 241. By extending beyond the bottom layers 242, the top layers 244 create overhangs 246 and undercuts 247.

It is preferred that the base layers 242 be a PMGI™ 0.2 µm thick and the image layer 244 be a photo-imagable or photo-sensitive layer, such as AZ1505™. The bi-layer photoresist 240 can be applied through any of a variety of well known methods including first spinning on the base layer 242 over the magnetic bias material 230, then spinning on the image layer 244 over the base layer 242, applying a mask over the photoresist 240, exposing the photoresist 240 to harden the image layer 244, and removing the unhardened portions of the image layer 244 and portions of the base layer 242 with a developer. During such a process, because the base layer 242 is significantly softer (dissolves quicker during the application of a developer) than the image layer 244, the overhang 246 and undercut 247 are created on each side of the bi-layer photoresist 240. The length of the overhang 246 and depth of the undercut 247 can be varied by controlling the duration of the application of the developer.

The next step in the method 300 is etching the exchange material and lead layers 340. This step in shown in FIGS. 2e and 4a. During this step portions of the magnetic bias 230 and the lead layer 220 set between the two sides of photoresist 240 are etched away. The etching can be done by a variety of well known methods, such as, ion milling and reactive ion beam etching (RIE). However, it is preferred that an ion beam etch be used. The ion beam etch removes the magnetic bias material 230 and the lead material 220 down to the alumina 210 to allow later placement of the sensor 250 (not shown). During the etching, the ion beam can be angled and the shadow of the overhang 246 can be used to produce a set of lead sloping sides 228 and a set of magnetic bias sloping sides 238. By sloping the sides of the lead layers 220 and magnetic bias 230 the width of the sensor 250 can be reduced.

The next step in one embodiment of the method 300 is depositing sensor material 350. This step is shown in FIGS. 2f and 4a. This step involves the deposition of sensor material 250. As can be seen, the sensor material 250 is deposited over the exposed alumina 210 and the sides 228 and 238 are covered as well. A variety of types of sensor material can be used, however it is preferred that either an anisotopic magnetoresistive (AMR) or spin valve material be used. FIG. 2f shows the use of a spin valve 252.

One advantage to applying the sensor in this manner is that the magnetically soft sensor material can be deposited over a surface with a slight topography with much less difficultly than the deposition of a hard bias or exchange stabilized materials (as is done in the prior methods). This is because the sensor materials do not require a nucleating underlayer as the hard bias and exchange stabilized materials do.

Figure 4D:
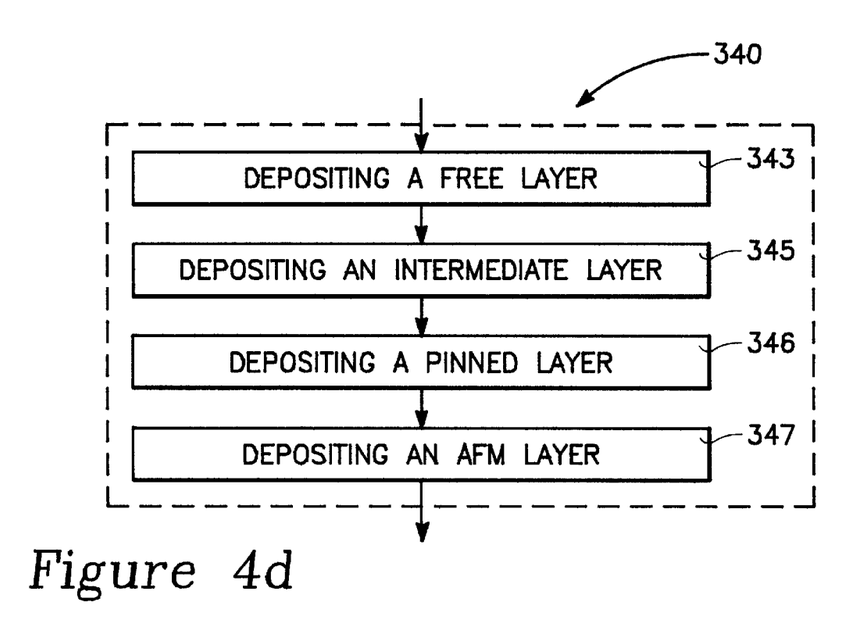

The layering of the spin valve material 252 includes, from the bottom, a free or sensing layer 253, a intermediate layer 255, a pinned layer 256 and an antiferromagnet (AFM) layer 257. Each of these layers are deposited by steps of the step of depositing sensor material 350, as shown in FIG. 4d. First, the free layer 253 is deposited by a step of depositing the free layer 343. During this step the free layer 253 is deposited over the alumina 210, the lead sloping sides 228 and the magnetic bias sloping sides 238. Prior to depositing the free layer 253 an etch can be performed to remove about 20 Å of the top layer 236 of the magnetic bias material 230. This etch removes any oxidation on the top layer 236. The free layer 253 is in direct contact with both leads 220, and as such a sensing current can travel from one lead 220 to the other through the free layer 253. The width of the free layer 253 between the leads 220 will correspond to the width of the data track on the media. In the next step, the intermediate layer 255 is deposited over the free layer 253 during a step of depositing an intermediate layer 345. The pinned layer 256 is deposited over the intermediate layer 255 during a step of depositing a pinned layer 346 and the AFM layer 257 is then deposited over the pinned layer during a step of depositing an AFM layer 347. The deposition of the free layer 253, Cu layer 255, pinned layer 256 and AFM layer 257, can all be done by well known methods, such as, ion beam deposition or sputtering.

The last step of one embodiment of the method 300 is lifting off the photoresist 360. This step is shown in FIGS. 2g and 4a. This step can be performed by a variety of well known methods, including applying a developer to dissolve the photoresist 240.

Figure 4E:
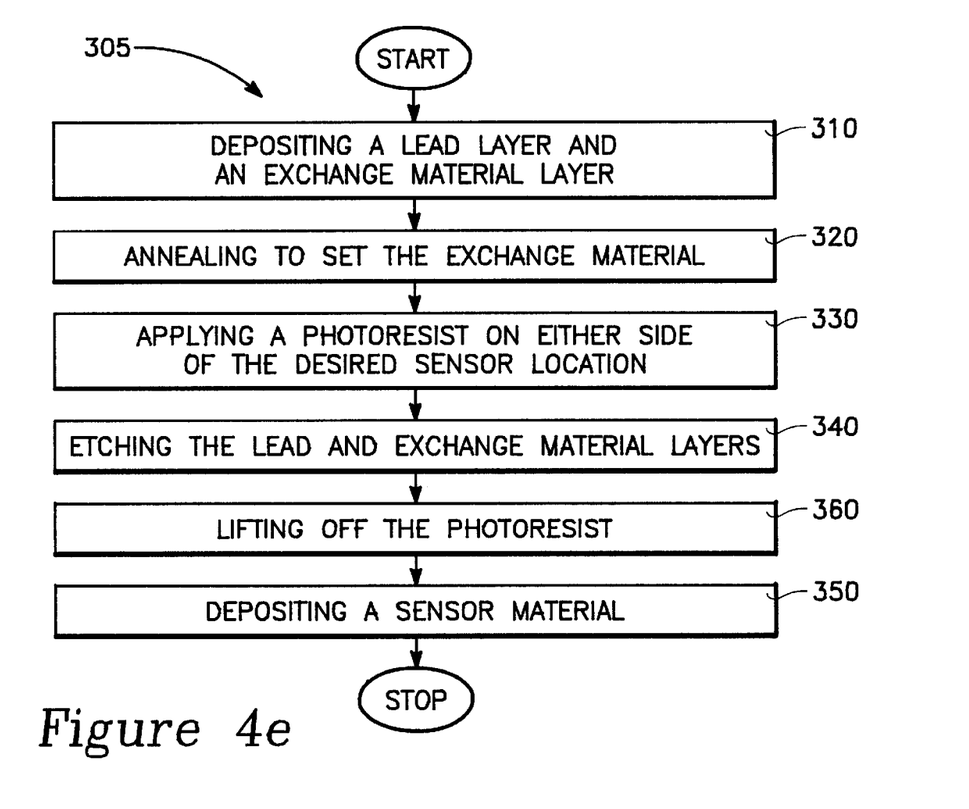

In another embodiment of the method, a method 305 has the step of lifting off the photoresist 360 performed before the step of depositing a sensor material 350. This embodiment is shown in FIGS. 2h–i and 4e. As shown in FIGS. 2h and 4e the photoresist 240 is removed after the step of etching the lead and exchange material layers 340. Then, in the step of depositing a sensor material 350 the sensor material 250 is deposited across the top of the alumina 210, the leads 220 and the magnetic bias material 230, as shown in FIGS. 4i and 4e. In this embodiment, with the free layer 253 of the sensor material 250 in direct contact with the magnetic bias material 230 which is an exchange stabilized material, the free layer and exchange stabilized material layer are exchange coupled.

Preferred Embodiments of the Exchange Stabilized Apparatus

The preferred embodiments of the exchange stabilized apparatus of the present invention includes the alumina 210, leads 220, magnetic bias material 230 and the sensor 250. In this embodiment the magnetic bias layer 230 is an exchange stabilized material. The magnetic bias layer 230 is shown in FIG. 2c and the rest of the apparatus is shown in FIG. 2g. The apparatus can be fabricated by the method 300 as detailed above.

The alumina or read gap alumina 210 is preferably made of alumina ($Al_2O_3$) and functions to insulate the read sensor. Other insulative materials could be used for the read gap alumina 210, such as $SiO_2$, $Ta_2O_5$, $Si_3N_4$, MgO, SiC and amorphous carbon. The alumina 210 typically is between 0.01–0.10 μm thick. The alumina 210 is the bottom layer of the apparatus and provides a relatively uniform surface for the lead layer 220 which is deposited over the alumina 210.

The leads 220 are positioned above the alumina 210 and on either side of the sensor 250. The leads 220 can be of any sufficiently conductive material, however, it is preferred that the leads 220 be a layering of tantalum(Ta)/gold(Au)/tantalum(Ta). The bottom tantalum layer 222 and the top tantalum layer 226 act as seed layers, providing improved adhesion (as compared to the adhesion of gold), to the adjacent layers. In this embodiment, preferably the bottom layer of tantalum 222 is 50 Å thick, the gold layer 224 is 300 Å thick, and the top layer of tantalum 226 is 50 Å thick. The leads 220 also preferably have sloping sides 228. The leads 220 function to supply a sensing current across the sensor 250.

In this embodiment the magnetic bias layer is a hard bias material and includes a lower layer 234, a middle layer 235 and a top layer 236, as shown in FIG. 4c. The lower layer 234 is positioned on top of the lead material 220. Preferably, the lower layer 234 is a layer of nickel iron (NiFe) 75 Å thick, however this layer can range between 20 and 100 Å thick. Other materials could be used for the lower layer 234. The middle layer 235 is positioned over the lower layer 234. It is preferred that the material used for the middle layer 235 is manganese nickel (MnNi), manganese platinum(MnPt), manganese palladium (MnPd) or manganese platinum palladium (MnPtPd). However, other similarly suitable materials could be used for this layer, including platinum palladium (PtPd) and palladium manganese (PdMn). The middle layer 235 can have a thickness between 100 and 400 Å, but it is preferred that the layer has a thickness of 300 Å. The top layer 236 is located above the middle layer 235. Preferably, the top layer 236 is a layer of nickel iron (NiFe) 50 Å thick, however, this layer can range between 20 and 100 Å thick. Alternative materials could be used for the top layer 236.

The top layer 236 acts to protect the middle layer 235 from oxidizing before the next layer is placed above the magnetic bias layer 230.

The sensor 250 is positioned over the alumina 210 and between the leads 220 and the magnetic bias layers 230. The sensor 250 can be any of a variety of types of material, however it is preferred that either an anisotopic magnetoresistive (AMR) or spin valve material is used. For spin valve sensors, it is preferred that the spin valve be a top spin valve. That is, that the pinned layer be on top of the sensor and the free layer be on the bottom.

As noted, the layering of the spin valve material 252 includes, from the bottom, a free or sensing layer 253, an intermediate layer 255, a pinned layer 256 and an antiferromagnet (AFM) layer 257. The free layer 253 has edges 254. The free layer 253 is in direct contact with both leads 220, such that a sensing current can travel from one lead 220 to the other through the free layer 253. The width of the free layer 253 between the leads 220 will correspond to the width of the data track on the media. The width of free layer 253 is sufficiently small to allow for narrower data tracks which in turn allows increased data storage of the media. It is preferred that the width of the free layer 253 be less than 0.6 µm. The magnetic bias layers 230 are set close enough to the edges 254 of the free layer 253 of the sensor 250 to bias the sensor 250 with the magnetic field of the exchange stabilized layers of the magnetic bias layers 230.

The free layer 253 functions to sense the position of the magnetic field created by the data bits located on an adjacent recording media. The free layer 253 performs this function by being free to change its magnetic orientation in response to a magnetic field of the magnetized data bits. As the magnetic orientation of the free layer 253 changes, the electrical resistance of the free layer 253, and thus of the device, is also changed. The measured changes in the electrical resistance can be converted to correspond to the data stored on the recording media. A variety of materials can be used in the free layer 253, for example, the free layer 253 can be a layer of cobalt iron (CoFe) over a nucleating layer of nickel iron (NiFe) or tantalum (Ta) . But, to increase exchange coupling, it is preferred that a tantalum nucleating layer is not used. The intermediate layer 255 is preferably made of copper (Cu). The pinned layer 256 functions to set a reference state for the free layer 253. The pinned layer 256 is preferably made of cobalt iron (CoFe), but can also be made of Nickel Iron (NiFe), Cobalt (Co) or a Heusler alloy. The AFM layer 257 functions to provide a base for the pinned layer 256. The AFM layer 257 can be made of a variety of materials including iridium manganese (IrMn), platinum manganese (PtMn), platinum palladium manganese (PtPdMn) or nickel manganese (NiMn).

Another embodiment of the apparatus of the present invention is shown in FIG. 2i. In this embodiment the sensor material 250 extends across the entire sensor and not over just a portion of the sensor as shown in the embodiment set forth in FIG. 2g. The layering of the sensor material 250 of this embodiment is same as the other embodiment. That is, the sensor 250 can be any of a variety of types of material, however it is preferred that either an anisotopic magnetoresistive (AMR) or spin valve material is used. For spin valve sensors it is preferred that the spin valve be a top spin valve. That is, that the pinned layer be on top of the sensor and the free layer be on the bottom. The layering of the spin valve material 252 includes, from the bottom, a free or sensing layer 253, an intermediate layer 255, a pinned layer 256 and an antiferromagnet (AFM) layer 257.

While the invention has been described in detail by specific reference to preferred embodiments, it is understood that the above description is not limiting of the disclosed invention and variations and modifications thereof may be made without departing from the true spirit and scope of the invention.

What is claimed is:

1. A magnetoresistive head structure comprising:
   a lead layer;
   a magnetic bias layer positioned over the lead layer and including a planar top surface;
   an aperture disposed through the lead and magnetic bias layers, the magnetic bias layer having end regions at the aperture; and
   a sensor disposed within the aperture and including sides contacting the top surface only at the end regions.

2. The magnetoresistive head structure of claim 1, wherein the lead layer comprises:
   A. a first tantalum layer about 50 Å thick;
   B. a gold layer about 300 Å thick, wherein the gold layer is positioned over the first tantalum layer; and
   C. a second tantalum layer about 50 Å thick, wherein the second tantalum layer is positioned over the gold layer.

3. The magnetoresistive head structure of claim 1, wherein the magnetic bias layer comprises a hard bias layer.

4. The magnetoresistive head structure of claim 3, wherein the hard bias layer comprises:
   A. an underlayer comprising chromium, wherein the underlayer is about 50–200 Å thick; and
   B. a permanent magnet layer over the underlayer, wherein the permanent magnet layer comprises cobalt, chromium and platinum and wherein the permanent magnet layer is about 500 Å thick.

5. The magnetoresistive head structure of claim 1, wherein the magnetic bias layer comprises an exchange layer.

6. The magnetoresistive head structure of claim 5, wherein the exchange layer comprises:
   A. a first nickel iron layer about 75 Å thick;
   B. a manganese nickel layer about 100–300 Å thick, wherein the manganese nickel layer is positioned over the first nickel iron layer; and
   C. a second nickel iron layer about 50 Å thick, wherein the second nickel iron layer is positioned over the manganese nickel layer.

7. The magnetoresistive head structure of claim 1, wherein the sensor is a magnetoresistive element comprised of one from the group of an anisotopic magnetoresistive element and a spin valve element.

8. The magnetoresistive head structure of claim 7, wherein the sensor has a sensing layer with a width and wherein the width of the sensing layer is less than about 0.6 µm.

9. A magnetoresistive head structure comprising:
   a lead layer;
   a magnetic bias layer positioned over the lead layer and including a planar top surface;
   an aperture disposed in the lead and magnetic bias layers; and
   a sensor disposed within the aperture and including tapered ends that terminate above the top surface.

* * * * *